Sept. 29, 1959     J. F. SCHOEPPEL     2,906,128
RATE SWITCH
Filed April 8, 1958

INVENTOR.
JOHN F. SCHOEPPEL

United States Patent Office 2,906,128
Patented Sept. 29, 1959

2,906,128

RATE SWITCH

John F. Schoeppel, Grand Rapids, Mich., assignor to Lear, Incorporated

Application April 8, 1958, Serial No. 727,198

4 Claims. (Cl. 74—5.34)

This invention relates to a rate switch and, more particularly, to a rate switch to alter the characteristics of an instrument when a particular turn rate is exceeded or a particular set of turn conditions is obtained.

In aircraft utilizing displacement gyroscopes, it is desirable to maintain the gyroscopes in a normal position and to do this an erection system is provided. The erection system is usually responsive to an electrical signal from a pickoff device which senses movement of the gyroscope about its precession axis. A typical erection system uses the sensing signal, either directly or amplified, to apply torque to the gyro to coerce it to the signal null position. When the gyroscope is in its desired normal position, the pickoff device is in electrical null, and, therefore, does not emit an electrical signal to activate the erection system. A problem arises when the vehicle goes into a turn and reaches a rate of turn such that the centrifugal force makes erection of the gyroscope cause an error rather than correct it, in which case it is desirable to cut out the erection system.

A known arrangement is to use an electrolytic switch in maintaining the vertical gyro in a locally earth level condition. In this case, the electrolytic switch containing fluid and an air bubble senses movement of the gyro from vertical and activates an erection system when the gyro deviates from a locally earth level condition. If, however, centrifugal forces from a high rate of turn are acting on the fluid and air bubble in the switch, then the switch gives a false output and consequently the vertical gyro is erroneously erected.

Present known arrangements to cut out the erection of a vertical gyro require the addition of a rate gyro mounted on the structure of the vehicle. The rate gyro senses the rate of turn of the vehicle and, when a given rate of turn is exceeded, sends a signal which cuts out erection of a displacement gyro. The disadvantages of a rate gyro for this purpose are largely economic. The rate gyro is costly and its complexity renders it less reliable than this invention.

Therefore, it is an object of this invention to provide a means of cutting out the erection of a vertical gyro to eliminate effects of centrifugal force when a given rate of vehicle turn is exceeded.

Another object of this invention is to provide an inexpensive and simple rate switch to eliminate the effects of centrifugal force on a vertical gyro.

Still another object of this invention is to provide a rate switch which utilizes equipment already in the aircraft.

In brief, the device senses rate of turn or rate of motion about any axis of a moving body, determines the characteristics of the turn, for example, the rate or rate of change of rate, then modifieds the characteristics of a vertical gyroscope or other instrument according to a preset schedule or program.

A fuller understanding of the objects and advantages of this invention will become obvious from the following description taken in conjunction with the drawings in which.

Figures 1, 2, 3:
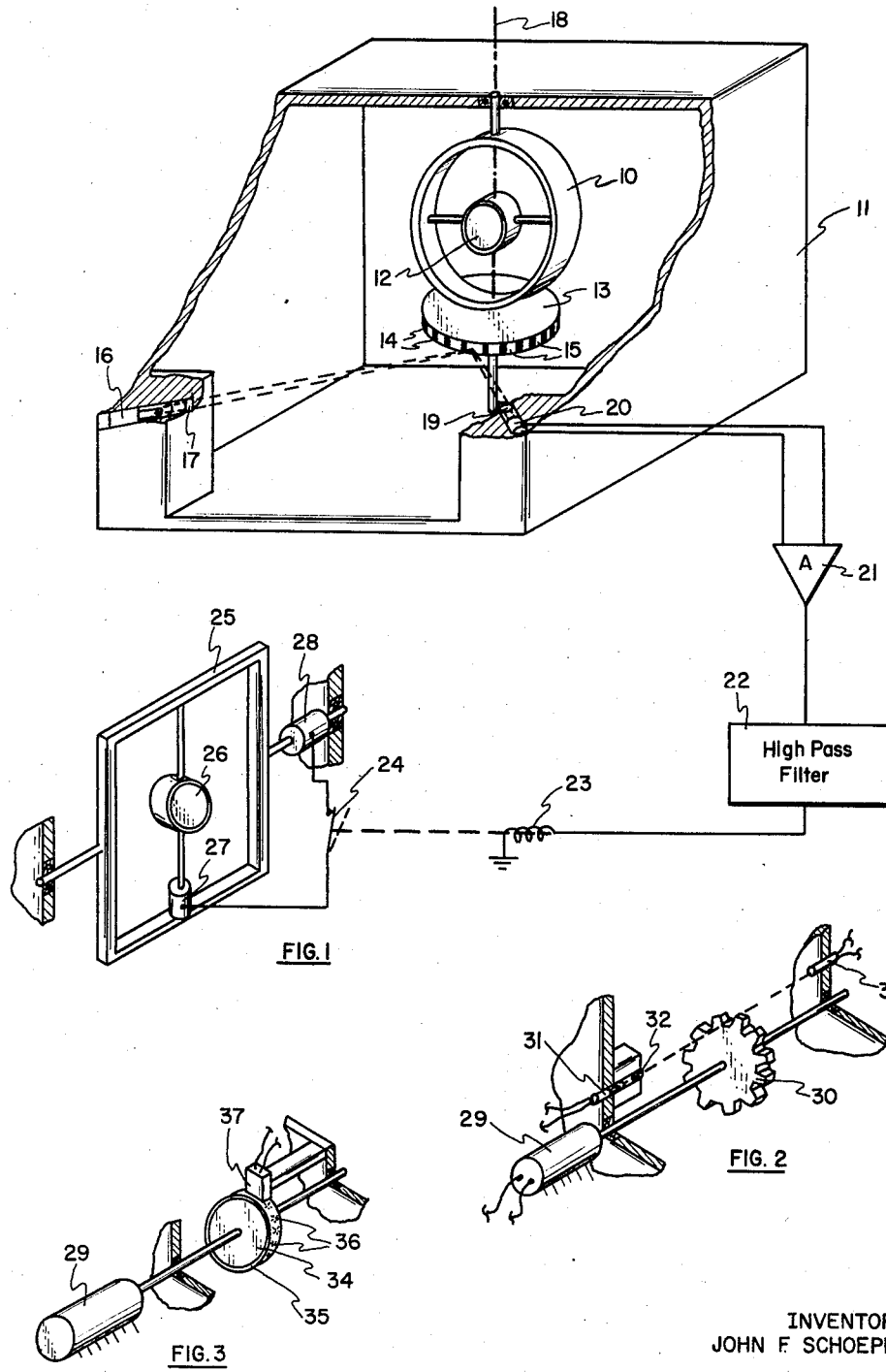
Fig. 1 is a perspective view of the present invention with sections broken away.
Fig. 2 is a view showing a second embodiment of the present invention.
Fig. 3 is a third embodiment of the present invention.

Referring now to Fig. 1, a gimbal ring 10 is mounted on and rotatably supported by the aircraft or vehicle structure 11. A directional or other displacement gyro 12 is supported by the gimbal ring 10. A disc 13 is rigidly fixed to the gimbal ring 10 and has along its peripheral edge alternate light absorbing portions 14 and light reflecting portions 15, e.g., black and white paint. A light source 16 is positioned on the vehicle structure 11 such that the light rays are focused by a focusing lens 17 onto the peripheral edge of the disc 13. As the vehicle rotates with respect to the disc 13 about axis 18, the light rays strike alternately the light absorbing portions 14 and light reflecting portions 15 of disc 13. A second focusing lens 19 is positioned to receive the light reflected from the light reflecting portions 15 and focus the same on a photo cell 20 which is also mounted on the vehicle structure 11. An amplifier 21 is electrically connected to photo cell 20 to receive and amplify any electrical signal emitted by photo cell 20. A high pass filter circuit 22 is electrically connected to amplifier 21 to receive the amplified signals from amplifier 21. The high pass filter circuit 22 allows high frequency signals to pass to a solenoid 23 which is connected by suitable electrical wiring and responsive to an electrical signal from the high pass filter circuit 22.

A switch 24 is mechanically linked to and operated by the solenoid 23. A second gimbal 25 supports a second gyro 26. The gyro 26 has a pickoff means 27 for detecting the movement of the gyro 26 about its precession axis. A torque means 28 is electrically connected and responsive to signals from the pickoff means 27 and is capable of transmitting torque to the gimbal 25 to erect the gyro 26. The pickoff means 27 can be any conventional type of pickoff such as a photoelectric pickoff or an electrolytic switch may be used to keep the vertical gyro in an earth level condition.

In operation, the natural characteristics and functions of gyro 12 maintain the gimbal 10 in a stable position. The disc 13, being fixed to the gimbal 10, is likewise held stationary. Therefore, when the vehicle rotates or turns about axis 18, the light source and the photo cell turn also causing the light source to emit light rays which are focused alternately on the light reflecting surfaces 15 and light absorbing surfaces 14 causing intermittent light to pass to the photo cell 20. This, in turn, causes an intermittent electrical signal to be emitted by photo cell 20. The intermittent electrical signal is amplified by amplifier 21 and passes on to high pass filter 22. The high pass filter 22 allows only the electrical signals above a fixed or given frequency to pass to the solenoid 23. If the vehicle's rate of turn is sufficient, the intermittent signals emitted by the photo cell 20 being of a high enough frequency will pass through the high filter circuit 22 and cause the relay switch 24 to operate which will cut out the erection system, comprising the pickoff 27 and torque means 28, from erecting the vertical gyro 26. In other words, when a set rate of turn of the vehicle is reached, the relay switch 24 operates.

The invention may be modified in several ways such as shown in Fig. 2 wherein a repeater 29 is electrically connected to the displacement gyroscope and repeats the angular displacement of the displacement gyroscope with respect to the vehicle. This, in turn, causes the saw tooth disc 30 to rotate with respect to the vehicle at the same rate that the displacement gyroscope rotates with respect to the vehicle. A light source 31 emits light rays which are focused by a lens 32 onto a photo cell 33. The light source 31 and photo cell 33 are positioned such that the saw tooth disc 30 intermittently interrupts the passage of light rays from the light source 31 to the photo cell 33. The signal emitted by the photo cell 33 would then be handled the same as shown in Fig. 1 and heretofore described.

Fig. 3 shows still another embodiment of the present invention. In this case, the repeater 29 causes a disc 34 having a magnetic tape 35 on the outside diameter thereof to rotate with respect to the vehicle at the same rate with which the displacement gyro rotates with respect to the vehicle. The magnetic tape has spaced magnetized portions 36 thereon and a magnetic readout head 37 is positioned such that as the vehicle rotates, the tape 35 passes under magnetic readout head 37. As is known in the art, the magnetic readout head will emit an electrical signal each time a magnetized portion 36 passes under the head 37. The signals emitted by the magnetic readout head 37 are then processed as described above.

It can be seen that the discs shown in Fig. 1, 2 and 3 will all emit an electrical signal having a frequency proportional to the rate of turn of the vehicle with respect to the displacement gyro and, therefore, when a given rate of turn is exceeded, the erection system of the vertical gyro 26 will be disconnected.

It is to be noted that in vehicles utilizing gyros, the gimbal ring 10 and gyro 12 are already part of the vehicle's equipment and this invention provides a double use for a displacement gyro. Thus, the invention performs the functions of a rate gyro but utilizes less equipment and is simple in construction.

Although the present invention has been described with a certain degree of particularity, it is understood that various modifications in the details and arrangements of parts may be had without departing from the spirit and scope of the invention as hereinafter claimed.

I claim:

1. In an aircraft, a vertical gyro, a directional gyro, means normally maintaining said vertical gyro locally earth level, a photoelectric cell capable of producing an electrical signal and light source mounted on said aircraft such that said light source emits light rays which are focused upon the face of said photoelectric cell, a disc mounted on a shaft which reproduces movement of said aircraft with respect to said directional gyro, said disc being positioned between said light source and said photoelectric cell and having means thereon to intermittently interrupt the light rays passing to said photoelectric cell as the aircraft rotates with respect to said disc, and a frequency-responsive relay for disengaging said leveling means when said signal reaches a predetermined frequency.

2. In an aircraft, a vertical gyro, a directional gyro, means normally maintaining said vertical gyro locally earth level, a disc adapted to mount on a shaft reproducing movement of said aircraft with respect to said directional gyro, said disc having alternately spaced means for absorbing and reflecting light on the peripheral edge thereof, a light source and a photoelectric cell mounted on said aircraft such that said light source emits light rays which are focused upon the peripheral edge of said disc so that as said aircraft rotates about said axis, the light rays strike alternate light absorbing and light reflecting portions, said photoelectric cell, capable of emitting an electrical signal, being positioned to receive reflected light from said disc when the light from said light source strikes said reflecting means, and a frequency-responsive relay for disengaging said leveling means when said signal reaches a predetermined frequency.

3. In an aircraft, a vertical gyro, a directional gyro, means normally maintaining said vertical gyro locally earth level, a light source and a photoelectric cell mounted stationary on said aircraft and in line such that light rays from said light source are transmitted to the face of said photoelectric cell, a disc having a saw tooth edge mounted on a shaft maintained stationary by said directional gyro such that rotation of said aircraft causes said light rays to be intermittently interrupted by said saw tooth disc, means to amplify the electrical signal from said photoelectric cell, and a frequency-responsive relay for disengaging said levelling means when said signal reaches a predetermined frequency.

4. In an aircraft, a vertical gyro, a directional gyro, means normally maintaining said vertical gyro locally earth level, a disc mounted on a shaft reproducing movement of said aircraft with respect to said directional gyro and having a magnetic tape on the peripheral edge thereof, said magnetic tape having closely spaced magnetized portions thereon, a magnetic readout head mounted on said aircraft and associated with the peripheral edge of said disc such that rotation of said aircraft relative to said disc causes said magnetic readout head to emit intermittent electrical signals, means to amplify the signals from said magnetic readout head, a high pass filter circuit connected to receive said signals from said amplifying means, a delayed relay connected and responsive to signals from said high pass filter circuit such that said delayed relay operates to disengage said leveling means when said signal reaches a predetermined frequency.

References Cited in the file of this patent

UNITED STATES PATENTS

| 2,525,108 | Wolfert | Oct. 10, 1950 |
| 2,678,564 | Douglas et al. | May 18, 1954 |
| 2,716,894 | Nichols et al. | Sept. 6, 1955 |